J. CHARLTON.
Seed-Planter.
No. 20,143.
Patented May 4, 1858.
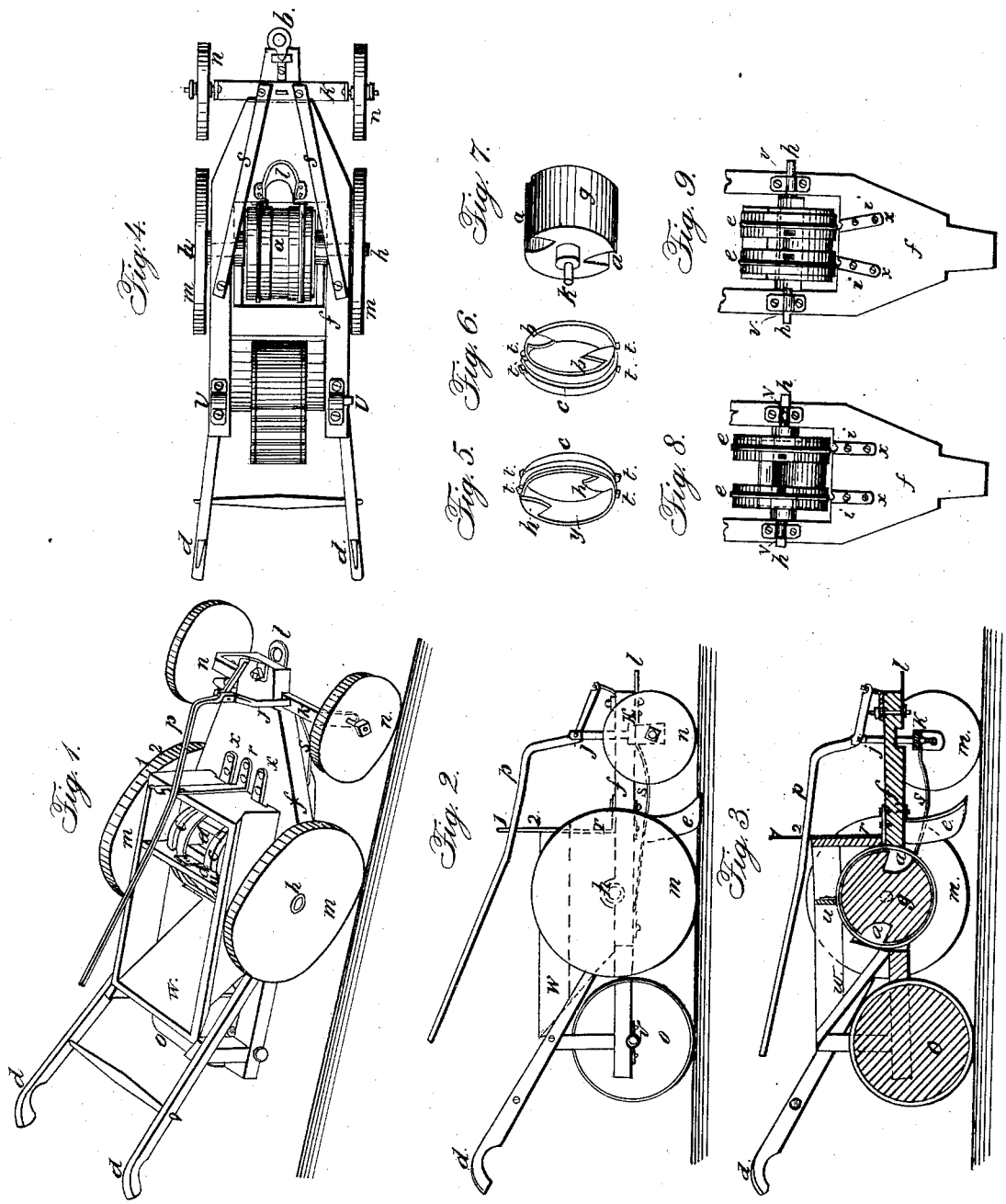

UNITED STATES PATENT OFFICE.

JAS. CHARLTON, OF ALLEGHENY CITY, PENNSYLVANIA.

IMPROVEMENT IN SEED-PLANTERS.

Specification forming part of Letters Patent No. 20,143, dated May 4, 1858.

*To all whom it may concern:*

Be it known that I, JAMES CHARLTON, of the city and county of Allegheny, in the State of Pennsylvania, have invented certain new and useful Improvements in Seed-Planters; and I do hereby declare that the following is a full and exact description thereof, reference being had to the accompanying drawings, and to the letters of reference marked thereon, similar letters referring to similar parts.

The nature of my invention consists in an arrangement for enlarging or contracting the size of the seed-chambers, so that they may be made to suit the various kinds and sizes of seed, and also in an arrangement for regulating the depth of the furrow made by the share or tooth of the planter.

To enable others skilled in the art to make and use my invention, I will proceed to describe its construction and operation.

In the accompanying drawings, Figure 1 is a perspective view of the planter. Fig. 2 is a side view of the planter. Fig. 3 is a sectional view of the planter. Fig. 4 is a bottom view of the planter. Figs. 5 and 6 are perspective views of the rings used for the purpose of enlarging or contracting the size of the seed-chambers. Fig. 7 is a perspective view of the cylinder which contains the seed-chambers. Fig. 8 represents a broken section of the front end of the planter, and represents the seed-chambers enlarged. Fig. 9 represents a broken section of the front end of the planter, and represents the seed-chambers contracted.

In the accompanying drawings, $f$ is the frame of the planter. $d$ are the handles. $w$ is the hopper. $l$ is the clevis. $m$ are the wheels which operate the cylinder containing the seed-chambers. $o$ is the roller used for pressing the earth over the seed. $e$ is the share or tooth for opening the ground. $n$ are the wheels used for the purpose of regulating the depth of the furrow.

The seed-chambers $a$ are made in the cylinder $g$, and are plainly shown in Fig. 7. Around the cylinder $g$ are placed two rings, $y$. Each of these rings is furnished with two lugs made to fit the sides and bottom of the seed-chamber $a$. The rings $y$ are also furnished with a head or flange, $c$, and four projecting studs, $t$. These projecting studs are used for the purpose of agitating the seed in the hopper. To the head or flange $c$ is fitted the strip $x$, in which is made a slot. (Marked $l$.) The strips $x$ are used for the purpose of holding the rings $y$ to the place desired on the cylinder $g$. To axle $h$ of the cylinder $g$ are attached the wheels $m$. The cylinder and rings are held to the frame $f$ by means of the journal-boxes $v$, and the cylinder $g$, with the rings $y$, extend up into the hopper $w$. By means of this arrangement of the cylinder $g$ the rings $y$, with their lugs $b$, projecting studs $t$, and heads $c$, and the use of the strips $x$, the seed-chambers $a$ can be enlarged or contracted, and when the planter is in motion the seed in the hopper agitated.

The wheels $n$ revolve on the axle $k$, which is held to its place by two flexible rods, $s$. One end of these rods is secured to the frame $f$. To axle $k$ is attached the yoke $j$, and the yoke is connected with the lever $p$, the fulcrum of which is on the front end of the planter. The lever $p$ is held in the desired position by means of notches 1 and 2 in the strip $r$, which is on the front end of the hopper. When the lever $p$ is placed in the notch marked 1 the share or tooth and the cylinder $g$, with its rings $y$, are made operative, and when the lever $p$ is placed in the notch marked 2 the front end of the frame of the planter is raised up and the wheels $m$ are prevented from coming in contact with the ground, thereby making the share or tooth $e$ and cylinder $g$, with its rings $y$, inoperative. By means of this arrangement of the wheels $n$, axle $k$, yoke $j$, lever $p$, and strip $r$ the planter may be made operative or inoperative, and any desired depth of furrow may be obtained by simply increasing the number of notches in the strip $r$ on the front end of the hopper. Thus the depth of furrow and the action or inaction of the planter can be obtained with ease and speed by the operator when standing between the handles of the planter.

The roller $o$, which is used for the purpose of pressing the earth over the seed, consists of a wooden drum and axle, the drum being furnished with a broad tire, which extends over the sides of the drum. By means of this arrangement a cheap and durable roller is obtained, and one that can be made in any part of the country.

The operation of the planter is as follows: The seed is placed in the hopper $w$ and the lever $p$ placed in notch marked 1. This movement of the lever will lower the front end of the planter, which will bring the wheels $m$ in contact with the ground, and the motion of the planter will cause the wheels $m$ to revolve the cylinder $g$ and rings $y$. The seed is agitated by the projecting studs $t$ on the rings $y$, and the seed is carried up and around by seed-chambers $a$ and passes under the cross-bar $u$, on which is placed a small piece of leather. This piece of leather brushes off the surplus seed, leaving the desired quantity to be carried around to the place of deposit.

Having thus described the nature, construction, and operation of my improvements in seed-planters, what I claim as of my invention, and desire to secure by Letters Patent of the United States, is—

I. The rings $y$, with their lugs $b$, projecting studs $t$, and heads $c$, in connection with the strips $x$ and cylinder $g$, for the purpose of enlarging or contracting the seed-chambers and agitating the seed in the hopper.

2. The arrangement of the flexible rods $s$, axle $k$, yoke $j$, lever $p$, and strip $r$, with notches 1 and 2, as herein described, and for the purpose set forth.

JAMES CHARLTON.

Witnesses:
EDWIN SPRAGUE,
ALEXANDER HAYS.